(12) United States Patent
Chu

(10) Patent No.: US 7,388,744 B2
(45) Date of Patent: Jun. 17, 2008

(54) DISPLAY WITH EXTERNAL DEVICE MODULE

(76) Inventor: James Chu, 381 Brea Canyon Rd., Walnut, CA (US) 91789

( * ) Notice: Subject to any disclaimer, the term of this patent is extended or adjusted under 35 U.S.C. 154(b) by 0 days.

(21) Appl. No.: 11/458,780

(22) Filed: Jul. 20, 2006

(65) Prior Publication Data

US 2008/0030935 A1 Feb. 7, 2008

(51) Int. Cl.
*G06F 1/16* (2006.01)
(52) U.S. Cl. ...................................... 361/681; 361/686
(58) Field of Classification Search ............... 361/681, 361/682, 686
See application file for complete search history.

(56) References Cited

U.S. PATENT DOCUMENTS

| 6,126,332 | A * | 10/2000 | Cubbage et al. ............ 710/2 |
| 6,366,452 | B1 * | 4/2002 | Wang et al. ............... 361/681 |
| 6,392,873 | B1 * | 5/2002 | Honda ....................... 361/681 |
| 2003/0080949 | A1 * | 5/2003 | Ditzik ........................ 345/173 |
| 2003/0098841 | A1 * | 5/2003 | Broussard ................... 345/156 |
| 2005/0032543 | A1 * | 2/2005 | Adkins ..................... 455/550.1 |
| 2006/0085800 | A1 * | 4/2006 | Chiu .......................... 720/600 |
| 2008/0002350 | A1 * | 1/2008 | Farrugia ..................... 361/686 |

\* cited by examiner

*Primary Examiner*—Jayprakash Gandhi
*Assistant Examiner*—Ingrid Wright
(74) *Attorney, Agent, or Firm*—Birch, Stewart, Kolasch & Birch, LLP

(57) ABSTRACT

A display with external device module includes a display panel and a base connected to the display panel via a connecting section. The base is provided with at least one USB connector for external devices, loudspeakers, and at least one receiving slot for mobile electric products; and the connecting section is provided with an all-in-one card reader slot. A control chip inside the base receives signals from the USB connector, receiving slot, all-in-one card reader slot, and loudspeakers. The received signals are then transmitted via a connector provided on the base to a computer host for operation, and any result from the operation is then transmitted to the base and/or the display panel. The mobile electric products may be connected to the computer host via the display with external device module without occupying extra space.

17 Claims, 5 Drawing Sheets

DISPLAY WITH EXTERNAL DEVICE MODULE

FIELD OF THE INVENTION

The present invention relates to a display, and more particularly to a display with external device module.

BACKGROUND OF THE INVENTION

The computer has become an indispensable apparatus in most people's daily life, and plays an important role in communication among people. The computer successfully shortens the distances between different places in the world. With the display of the computer, people could easily see what is happening at the other end of the world or even in the outer space. Therefore, it is one of many important issues in the modern society to design an advanced display satisfying the demands of most computer users.

A conventional computer display can only show images without any other additional functions. Therefore, many files stored on a storage media and all external devices must be externally connected to a computer host via particular wires or cables, so that data stored in the storage media and the external devices could be processed in the computer host. This is obviously not a good design from the viewpoint of modern people who pursue for simplicity, efficiency, and esthetics.

It is therefore tried by the inventor to develop a display with external device module to solve the problems existed in the conventional computer displays.

SUMMARY OF THE INVENTION

A primary object of the present invention is to provide a display with external device module, which is connected to a computer hose via a control chip located inside a base of the display, so that signals from external devices connected to the external device module may be transmitted to the computer host for operation without the need of using space-occupying connecting wires and/or cables.

Another object of the present invention is to provide a display with external device module, which is provided with an all-in-one card reader slot to read data from different types of memory cards without the need of using an external card reader. And the space needed by the external card reader is saved.

A further object of the present invention is to provide a display with external device module, which includes a base that is compatible with display panels of different sizes.

To achieve the above and other objects, the display with external device module according to a preferred embodiment of the present invention includes a display panel and a base connected to the display panel via a connecting section. The base is provided at a front end with at least one USB connector for at least one external device to connect thereto, within two lateral sides with at least one pair of loudspeakers, and at a top front with at least one receiving slot for receiving and electrically connecting to at least one mobile electric product, and the connecting section is provided at one lateral surface with at least one all-in-one card reader slot. A control chip is provided inside the base to receive signals from external devices connected to the USB connector, the receiving slot, the all-in-one card reader slot, and/or the loudspeakers. The received signals are then transmitted from the control chip via a connector provided on the base to a computer host for operation, and any result from the operation is then transmitted via the control chip to the base and/or the display panel. The display with external device module according to the present invention may be applied in displays of the same specifications, so that mobile electric products may be connected to the computer host via the external device module on the base of the display without occupying extra space.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
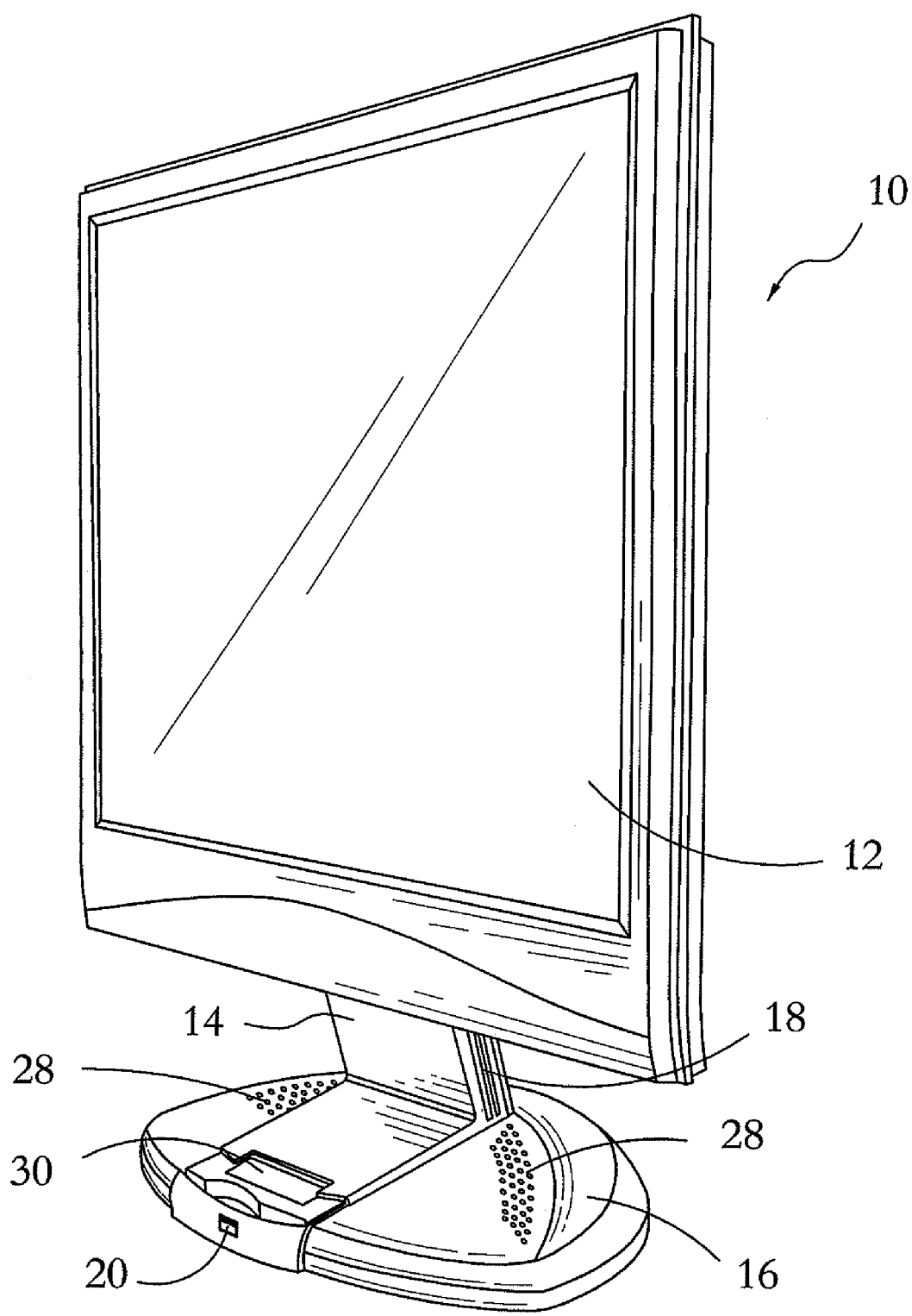
FIG. 1 is a front perspective view of a display with external device module according to a preferred embodiment of the present invention.
Figure 2:
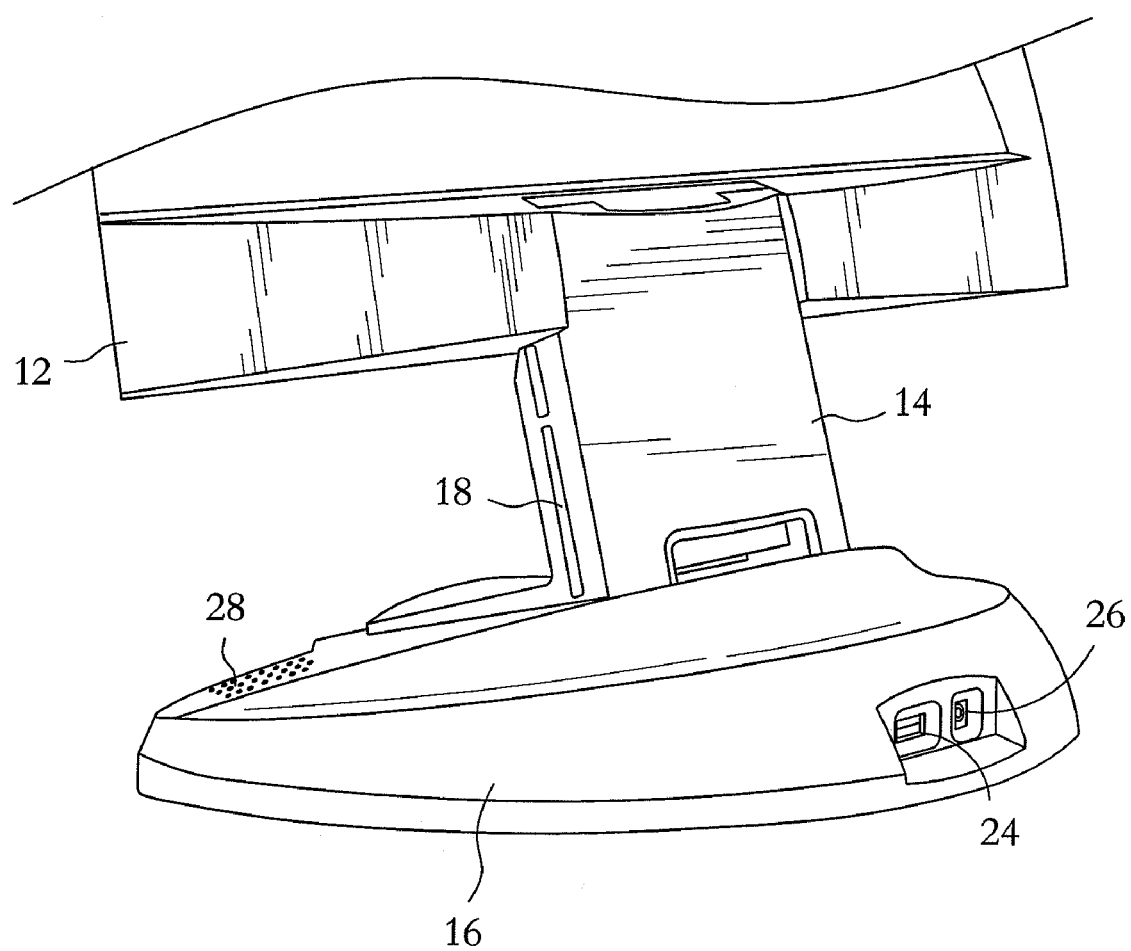
FIG. 2 is a fragmentary enlarged rear view of the display of FIG. 1.

Please refer to FIGS. 1 and 2 that are front perspective and fragmentary enlarged rear views, respectively, of a display with external device module according to a preferred embodiment of the present invention. As shown, the present invention includes a display 10, which consists of a display panel 12, a connecting section 14, and a base 16. The display panel 12 is a flat display panel and connected to the base 16 via the connecting section 14.

The connecting section 14 is provided at one lateral surface with an all-in-one card reader slot 18 to support reading of at least CF (Compact Flash) card, MD (Micro-Drive) card, MMC (MultiMedia Card) card, MS (Memory Stick) card, SD (SecureDigital) card, Mini SD card, SM (SmartMedia) card, and xD (eXtremeDigital) card.

The base 16 is provided at a front end with at least one USB (Universal Serial Bus) connector 20 for an external device 22 (not shown in FIG. 1) to connect thereto. The external device 22 may be, for example, a USB web phone, a USB microphone, a USB web camera, a USB mobile disk, a USB external TV (Television) box, a USB mobile phone charger, or any other device using USB. The base 16 is further provided at a rear end with a connector 24 and a power socket 26 for supplying power to the base 16. A pair of loudspeakers 28 is provided within two lateral sides of the base 16. And, a receiving slot 30 is provided on a top front of the base 16.

Figure 3:
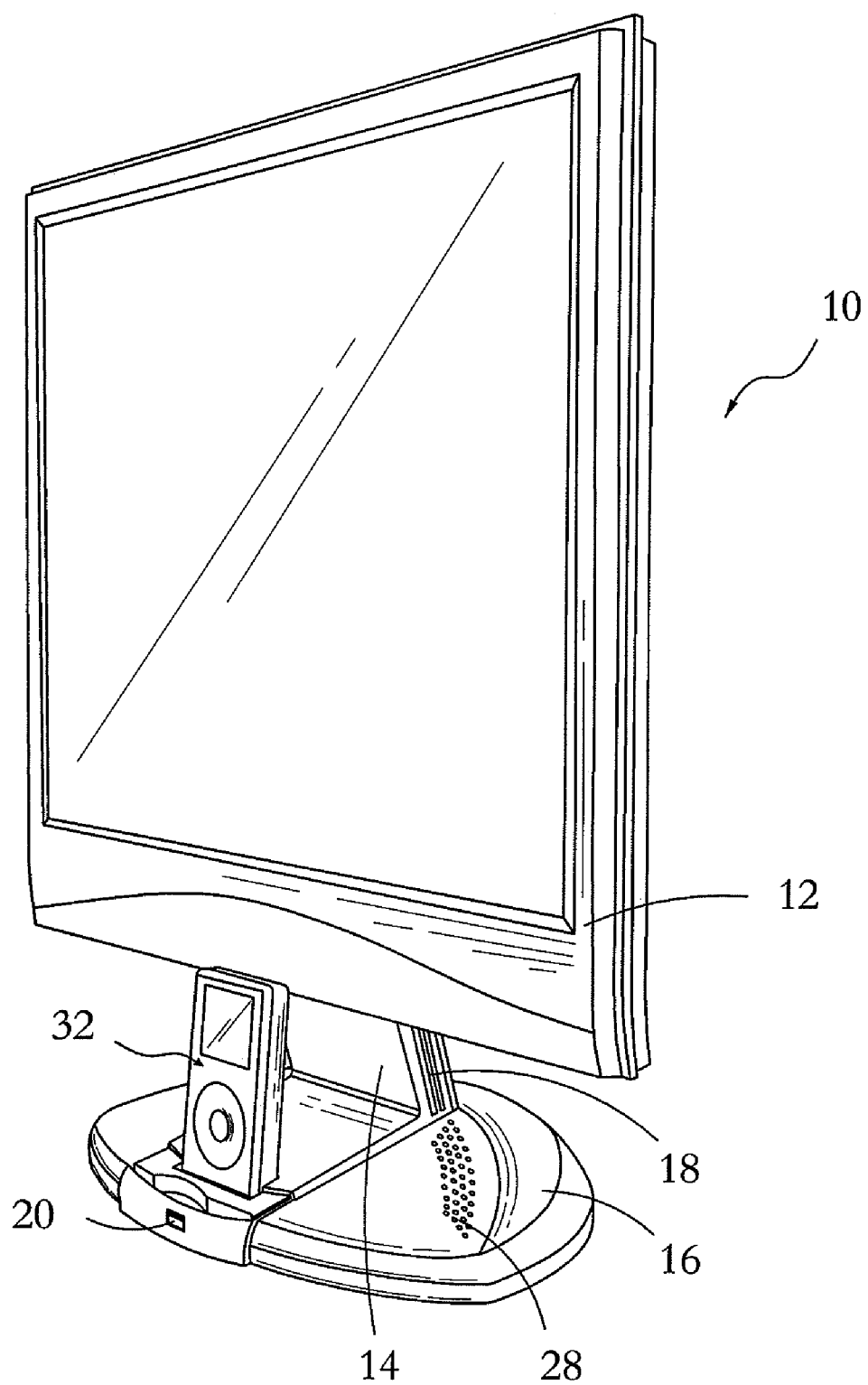
FIG. 3 shows the display with external device module according to the present invention in use.
Figure 4:
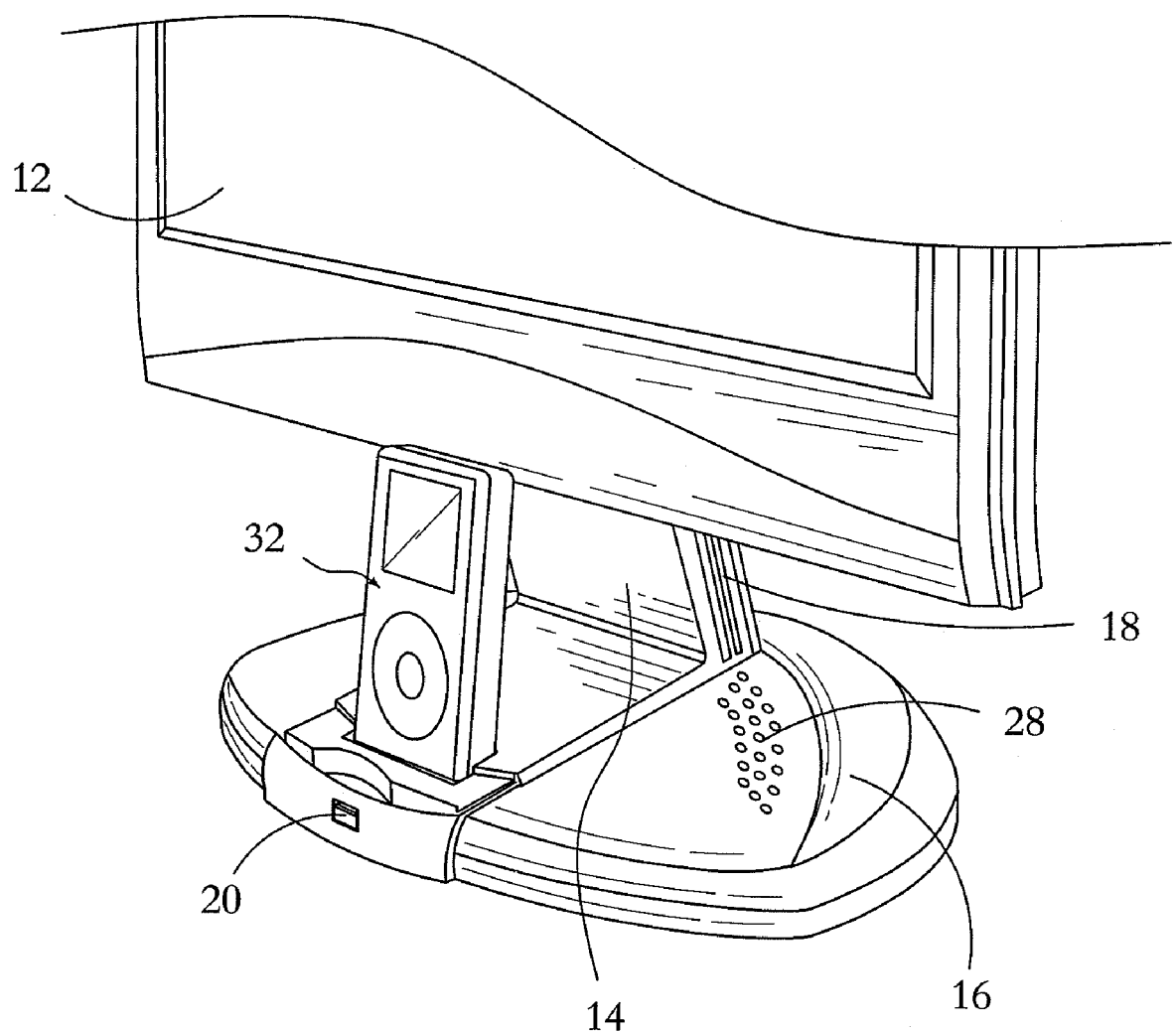
FIG. 4 is a fragmentary enlarged front view of the display of FIG. 3.

Please refer to FIG. 3 that is a front perspective view of a display with external device module according to the present invention in use, and to FIG. 4 that is a fragmentary enlarged view of FIG. 3. A mobile electric product 32 may be inserted in the receiving slot 30 to obtain power supply or input data via the receiving slot 30. The mobile electric product 32 may be, for example, an iPod mobile disk or other similar products, or a mobile phone. The receiving slot 30 is changeable according to the mobile electric product 32 to be used with the display 10 of the present invention, so that the display 10 with external device module is compatible with different types of mobile electric products 32.

Figure 5:
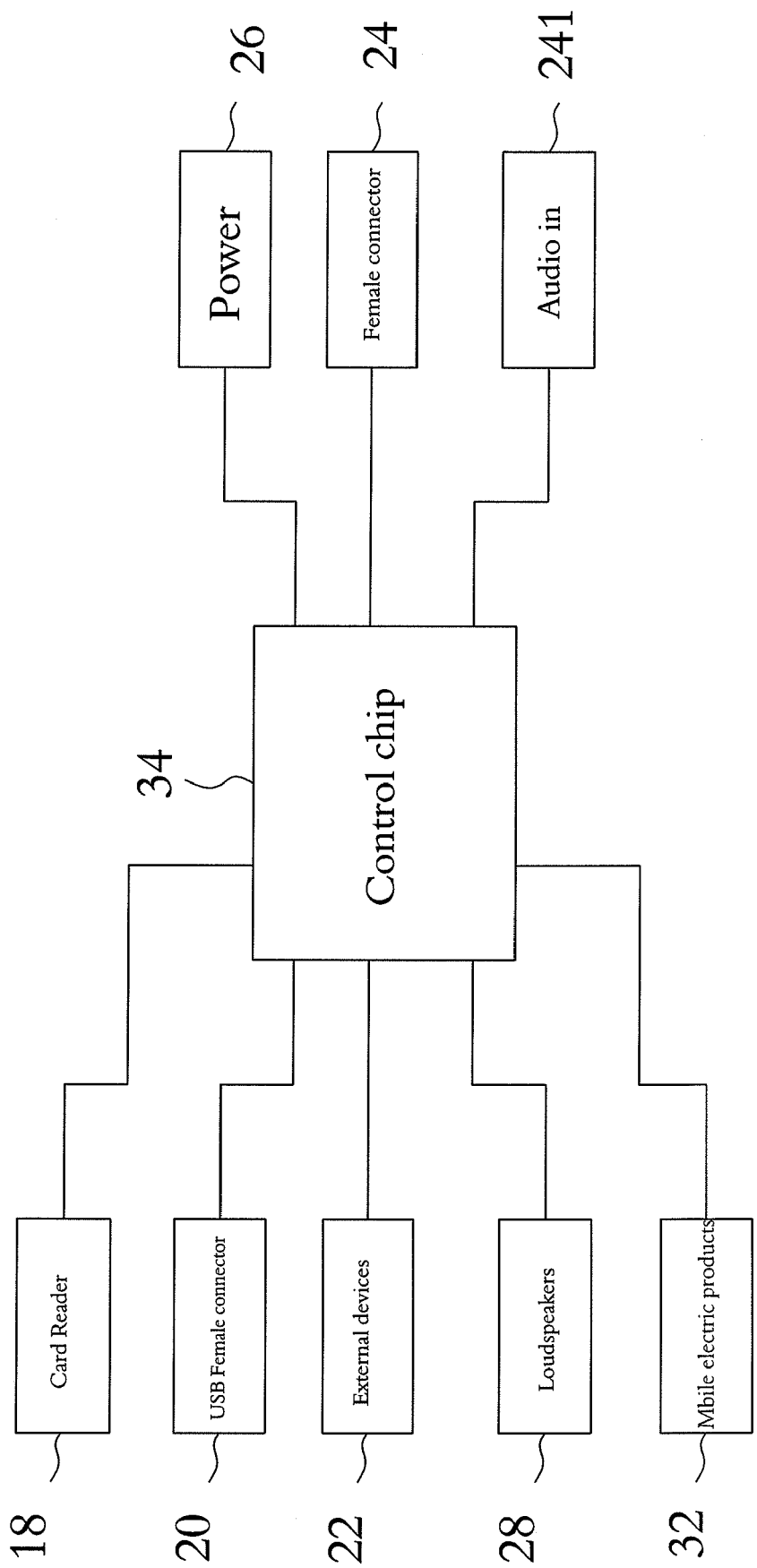
FIG. 5 is a block diagram of a control chip in the display with external device module according to the present invention.

FIG. 5 is a block diagram of a control chip 34 provided in the base 16 of the display 10 with external device module according to the present invention. Please refer to FIG. 5 along with FIGS. 1 and 3. The control chip 34 is electrically connected to the all-in-one card reader slot 18, the USB connector 24, the pair of loudspeakers 28, and the receiving slot 30 to receive signals from external devices connected to these different components, and is connected to a computer host (not shown) via the connector 24 and an Audio-in jack 241, so that signals received by the control chip 34 may be transmitted to the computer host for operation. Then, any result from the operation is transmitted from the computer host to the control chip 34 in the base 16 of the display 10 to be displayed on the display panel 12, and any sound may be output via the loudspeakers 28. In this manner, data in the mobile electric product 32 and other external devices 22 may be read without the need of connecting the mobile electric product 32 or other external devices to the computer host via electric wires or cables. When the connecting wires or cables are omitted, a desk top for supporting the display 10 shall be neat, orderly, and visually pleasant.

Power needed by the above-mentioned components included in the external device module on the base 16 may also be supplied via the power socket 26. Moreover, the base 16 may be used with display panels 12 of different sizes.

In brief, the present invention provides a display with external device module that may be applied in displays of similar specifications for conveniently and wirelessly connecting some frequently used mobile electric products to the computer host, so as to effectively save the space that is otherwise required by many external devices and connecting cables thereof.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A display with external device module, comprising a display panel and a base connected to said display panel via a connecting section;
   said base being provided at a front end with at least one USB connector for at least one external device to connect thereto, within two lateral sides with at least one pair of loudspeakers, and at a top front with at least one receiving slot for receiving and electrically connecting to at least one mobile electric product; and said connecting section being provided at one lateral surface with at least one all-in-one card reader slot; and
   a control chip provided inside said base to receive signals from said USB connector, said receiving slot, said all-in-one card reader slot, and said loudspeakers; said control chip being electrically connected to a computer host via a connector provided at a rear end of said base, so that said received signals are transmitted to and operated by said computer host; and any result from the operation is then transmitted from said computer host via said control chip to said base and/or said display panel, the display being physically separate from the computer host and being the display of the computer host displaying image from the computer host.

2. The display with external device module as claimed in claim 1, wherein said base is further provided at the rear end with a power socket for supplying power to said base.

3. The display with external device module as claimed in claim 2, wherein said power socket also allows power supply to said external device, said all-in-one card reader slot, said mobile electronic product received in said receiving slot, and said USB connector.

4. The display with external device module as claimed in claim 1, wherein said at least one external device is a USB web phone.

5. The display with external device module as claimed in claim 1, wherein said at least one external device is a USB microphone.

6. The display with external device module as claimed in claim 1, wherein said at least one external device is a USB web camera.

7. The display with external device module as claimed in claim 1, wherein said at least one external device is a USB mobile disk.

8. The display with external device module as claimed in claim 1, wherein said at least one external device is a USB TV box.

9. The display with external device module as claimed in claim 1, wherein said at least one external device is a USB mobile phone charger.

10. The display with external device module as claimed in claim 1, wherein said at least one external device is any device using USB.

11. The display with external device module as claimed in claim 1, wherein said receiving slot is changeable according to a type of said at least one mobile electric product.

12. The display with external device module as claimed in claim 1, wherein said at least one mobile electric product is an iPod mobile disk or other similar products.

13. The display with external device module as claimed in claim 1, wherein said at least one mobile electric product is a mobile phone.

14. The display with external device module as claimed in claim 1, wherein said all-in-one card reader slot supports at least CF card, MD card, MMC card, MS card, SD card, Mini SD card, SM card, and xD card.

15. The display with external device module as claimed in claim 1, wherein said display panel is a flat display panel.

16. The display with external device module as claimed in claim 1, wherein said base is compatible with display panels of different sizes.

17. The display with external device module as claimed in claim 1, wherein the base has a non-square shape and wherein the connecting section is located only at a midportion of a bottom edge of the display panel.

* * * * *